US011238122B2

(12) United States Patent
Giordani et al.

(10) Patent No.: US 11,238,122 B2
(45) Date of Patent: Feb. 1, 2022

(54) MANAGING CONTENT SHARING IN A SOCIAL NETWORK

(71) Applicant: INTERNATIONAL BUSINESS MACHINES CORPORATION, Armonk, NY (US)

(72) Inventors: Roberto Giordani, Rome (IT); Marco Martino, Rome (IT); Gianluca Bernardini, Rome (IT); Giuseppe Ciano, Rome (IT); Angelo Albanese, Rome (IT); Roberto Piras, Rome (IT); Salvatore D'Angelo, Sarno (IT); Valeria Perticara', Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 16/549,699

(22) Filed: Aug. 23, 2019

(65) Prior Publication Data

US 2021/0056153 A1 Feb. 25, 2021

(51) Int. Cl.
*G06F 16/00* (2019.01)
*G06F 16/9536* (2019.01)
*G06F 16/2457* (2019.01)
*G06F 16/9535* (2019.01)

(52) U.S. Cl.
CPC .... *G06F 16/9536* (2019.01); *G06F 16/24578* (2019.01); *G06F 16/9535* (2019.01)

(58) Field of Classification Search
CPC ............. G06F 16/9536; G06F 16/9535; G06F 16/24578
See application file for complete search history.

(56) References Cited

U.S. PATENT DOCUMENTS

| 9,591,089 B2 | 3/2017 | Herger et al. |
| 10,936,695 B2 | 3/2021 | Bonanni et al. |
| 2010/0057712 A1* | 3/2010 | Ranganathan ........ G06F 16/954 707/E17.014 |
| 2013/0166540 A1 | 6/2013 | Ganesh et al. |
| 2013/0218862 A1 | 8/2013 | Ghosh et al. |
| 2014/0201178 A1 | 7/2014 | Baecke et al. |

(Continued)

OTHER PUBLICATIONS

Mell et al., "The NIST Definition of Cloud Computing", NIST, Special Publication 800-145, Sep. 2011, 7 pages.

(Continued)

*Primary Examiner* — Hung Q Pham
(74) *Attorney, Agent, or Firm* — Maeve Carpenter; Andrew D. Wright; Roberts Calderon Safran & Cole, P.C.

(57) ABSTRACT

Embodiments of the invention provide for obtaining, by a computing device, query data from a query submitted by a user on a social network; determining, by the computing device, a topic of the query by extracting information from the query data; matching, by the computing device, the topic to content stored in a content database; determining, by the computing device, that the content can be shared with the user based on relationship data dynamically derived from user activity within the social network; and initiating, by the computing device, sharing of the content with the user based on the determining that the content can be shared, wherein the user is not statically connected to the content or the author of the content in the social network.

20 Claims, 9 Drawing Sheets

(56) References Cited

U.S. PATENT DOCUMENTS

2015/0012449 A1    1/2015    Jackson et al.
2016/0162485 A1*    6/2016    Bolshinsky ....... G06F 16/24578
                                                                               707/734
2017/0039278 A1*    2/2017    Marra .................... G06Q 50/01
2017/0139920 A1    5/2017    Ball et al.
2019/0379940 A1*    12/2019    Bentovim .......... H04N 21/2187

OTHER PUBLICATIONS

Anonymous, "Slack", https://en.wikipedia.org/wiki/Slack_(software), Wikipedia, accessed Jun. 8, 2019, 9 pages.

* cited by examiner

MANAGING CONTENT SHARING IN A SOCIAL NETWORK

BACKGROUND

The present invention relates generally to social networks and, more particularly, to managing content sharing in a social network.

Various social networks are available to enable users to communicate with other participants in the social network. Some social networking platforms provide cloud-based team collaboration tools and services. For example, certain platforms enable communities, groups or teams to join through a specific uniform resource locator (URL) or invitation. The communities may be categorized by topics. Public channels may be provided to allow team members to communicate without the use of email or group short message service (SMS). Private channels may also be provided to allow private conversations between subsets of a group. Direct message tools may also allow users to send private messages to particular users rather than a group.

In certain platforms, a channel is defined as a single place for a team of users to share messages, tools and files. Channels may be organized by team, project or other relevant categories. Users may be enabled to access multiple channels or only a single channel. In such platforms, threads may be utilized to allow for focused and organized side conversations within the channels. Threads let users respond directly to a message in a channel, keeping replies, images and other files organized under a single threaded conversation. In some implementations, threaded replies and associated data stay connected to an original posted message, and only those who have contributed or are following the thread are notified of any threaded responses.

SUMMARY

In a first aspect of the invention, there is a computer-implemented method including obtaining, by a computing device, query data from a query submitted by a user on a social network; determining, by the computing device, a topic of the query by extracting information from the query data; matching, by the computing device, the topic to content stored in a content database; determining, by the computing device, that the content can be shared with the user based on relationship data dynamically derived from user activity within the social network; and initiating, by the computing device, sharing of the content with the user based on the determining that the content can be shared, wherein the user is not statically connected to the content or the author of the content in the social network.

In another aspect of the invention, there is a computer program product including a computer readable storage medium having program instructions embodied therewith. The program instructions are executable by a computing device to cause the computing device to obtain posted content submitted by a user on a social network; determine a topic of the posted content; determine whether the topic matches historic topics stored in a content database, wherein the historic topics are topics of user queries submitted on the social network; determine whether the topic is relevant to one or more other users on the social network based on information extracted from the posted content; monitor activity on the social network between all users of the social network; dynamically generate relationship data defining relationships between the users of the social network based on the activity and user profile data of the users in a user profile database; and determine whether to share the posted content with the one or more other users on the social network based whether the topic matches historic topics, whether the topic is relevant to one or more other users, and the relationship data indicating that the posted content can be shared with the one or more other users.

In another aspect of the invention, there is system including a processor, a computer readable memory, and a computer readable storage medium. The system includes program instructions to obtain messages posted by one or more users on a social network; program instructions to derive information from the messages, including a topic of each of the messages; program instructions to maintain relationship information describing social relationships between the respective one or more users of the social network; program instructions to determine one or more other users of the social network who may receive the messages based on the topic of each of the messages and the relationship information; program instructions to determine, based on the topic of each of the messages and the relationship information, that one of the messages should be forwarded to the one or more other users; and program instructions to forward the message to the one or more other users, wherein the one or more other users are not participants in the same channel or thread that the message was posted to. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
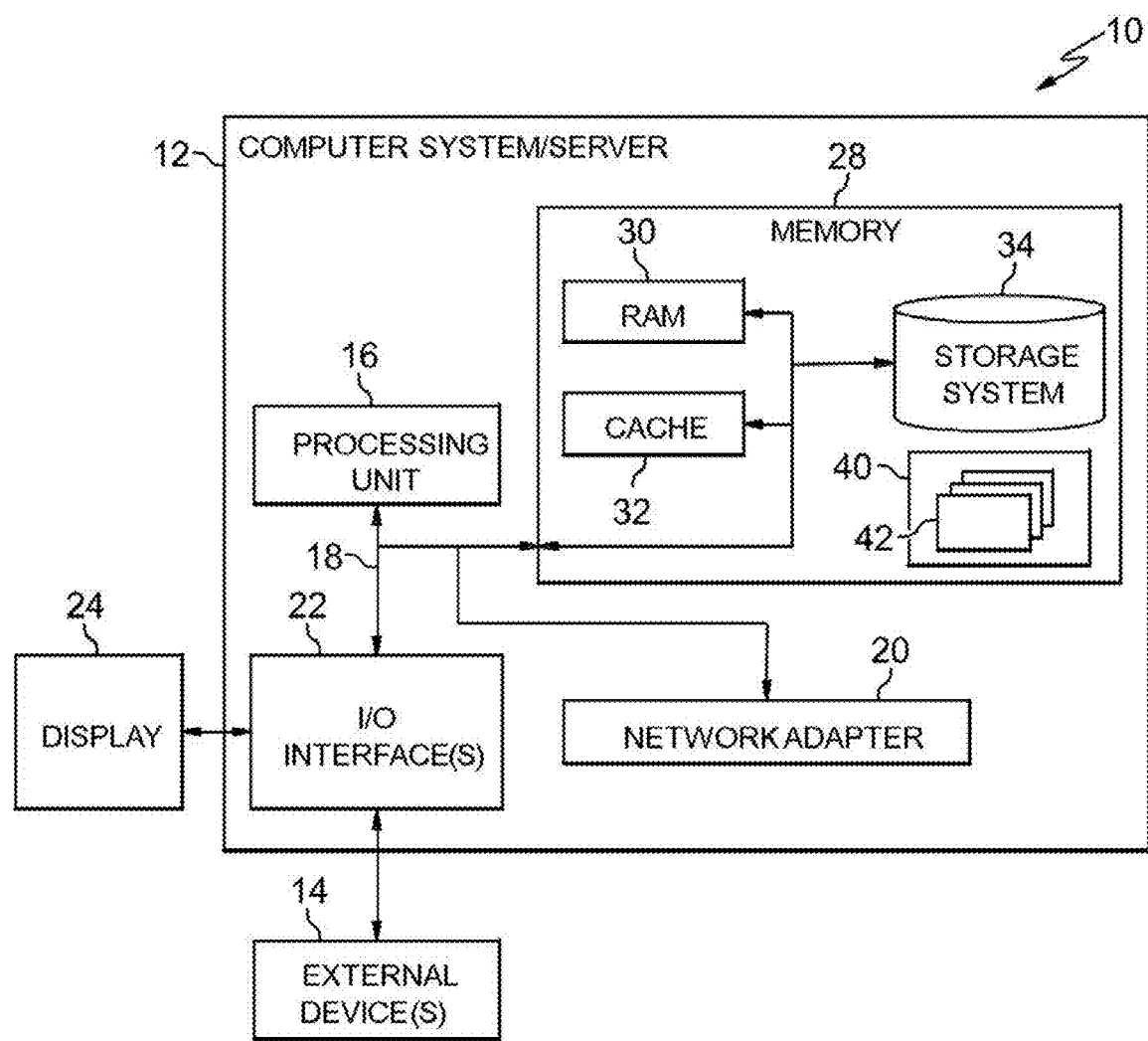
FIG. 1 depicts a cloud computing node according to an embodiment of the present invention.

The present invention relates generally social networks and, more particularly, to managing content sharing in a social network. In embodiments, systems and methods are provided for automatically sharing content (e.g., a message) posted in a social network by a user with other users of the social network.

In general, when a user of a social network wants to search or share a topic in the social network, it may be necessary to identify an appropriate audience that is interested in the topic or allowed to know the content of that topic. Some social network platforms enable users to belong to different channels and to reply to different conversation threads in the channel, and also enable direct communication between users through direct messaging tools. Content may be relevant to a user, but may not be accessible to the user. For example, participants in such social networks typically cannot or do not follow every thread. Additionally, it may be useful for the same content discussed in a different channel to be made known to others in the same network. Embodiments of the invention allow content sharing to authorized/appropriate people as determined based on the user and/or topic. This means: (a) a private discussion to the same topic must not be shared; (b) some topics might be shared with someone directly linked to the people involved in the discussion and not to everyone, but the topic can be shared only if it is considered "valuable" and will add value; and (c) if someone has shown an interest on a specific topic, they can be informed when new discussions on the topic occur, wherein the topic can only be shared if it is considered "valuable" and adds value.

Unlike previous content sharing tools, embodiments of the present invention determine the relationships inside a social network and can identify if the content can be shared or not. In implementations, a cognitive analysis of who posted a comment and who can know the content of the comment is conducted. Moreover, interest in a topic and relationships among people are built in dynamically as interactions between individuals within the network increase.

In embodiments, before sharing a topic on the social channel, a system builds, in a dynamic way, a relationship between the author of content and other members of the network. In aspects, the invention is configured to classify at least one posted message as private based on a topic derived from the message and based on relationship information related to users having sent or received the message. In implementations, an advisor component of a server analyzes a discussion/document content, using a business analytical mechanism, and identifies the appropriate target user groups within the network, and if or when the relevant information can be shared or not shared. Aspects of the invention enable a server to notify a user of content after some other user has already searched for the content discussed (by submitting a query).

Based on the above, implementations of the present invention provide technical improvements in the technical field of social network platforms. More specifically, embodiments of the invention address the technical problem of determining which users within a social network should be provided with digital content relevant to them, based on a determined topic of the content, a determined relevance of the content to the users, and dynamically determined relationship data. Thus, embodiments of the invention cause posted content to be shared with appropriate users who are not statically connected to the author of the posted content, such as through static channel or thread connections within the social network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
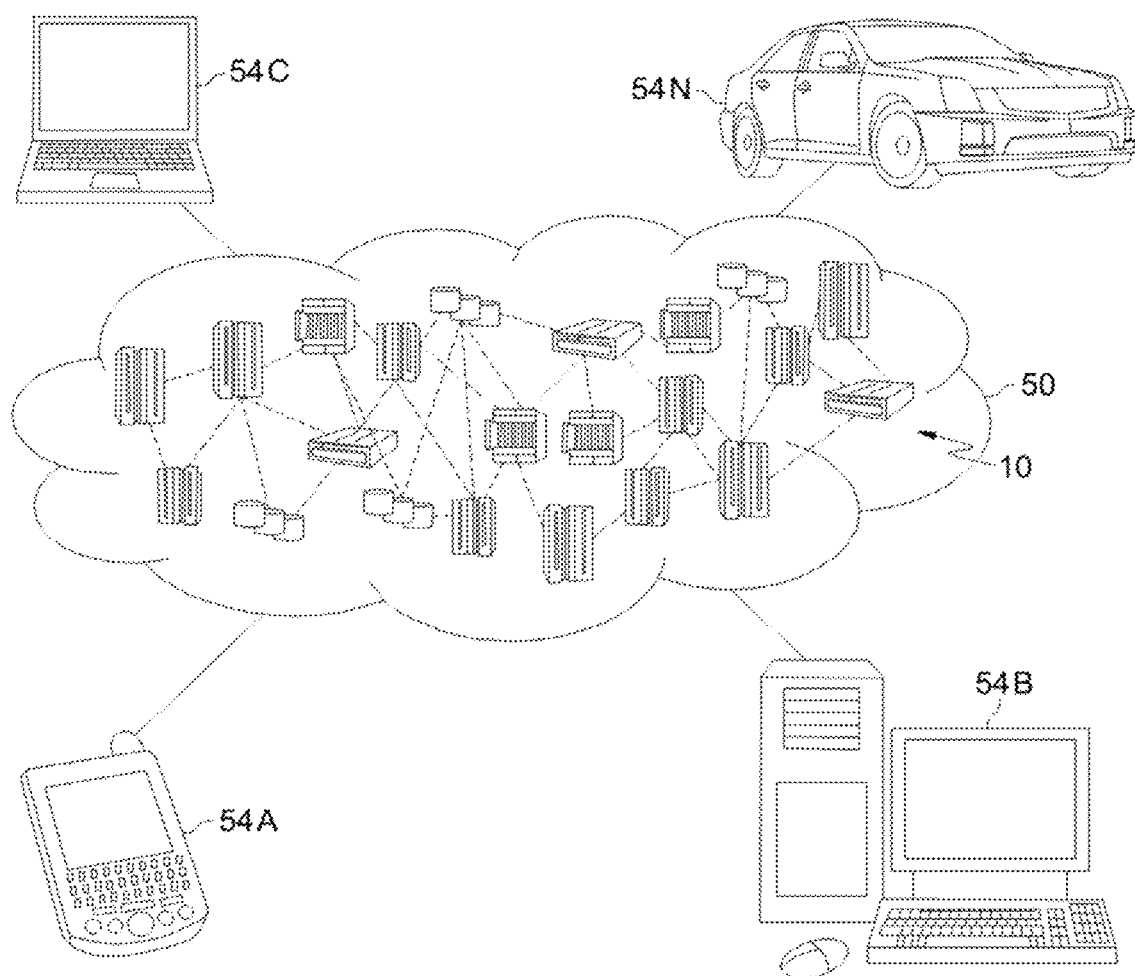
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
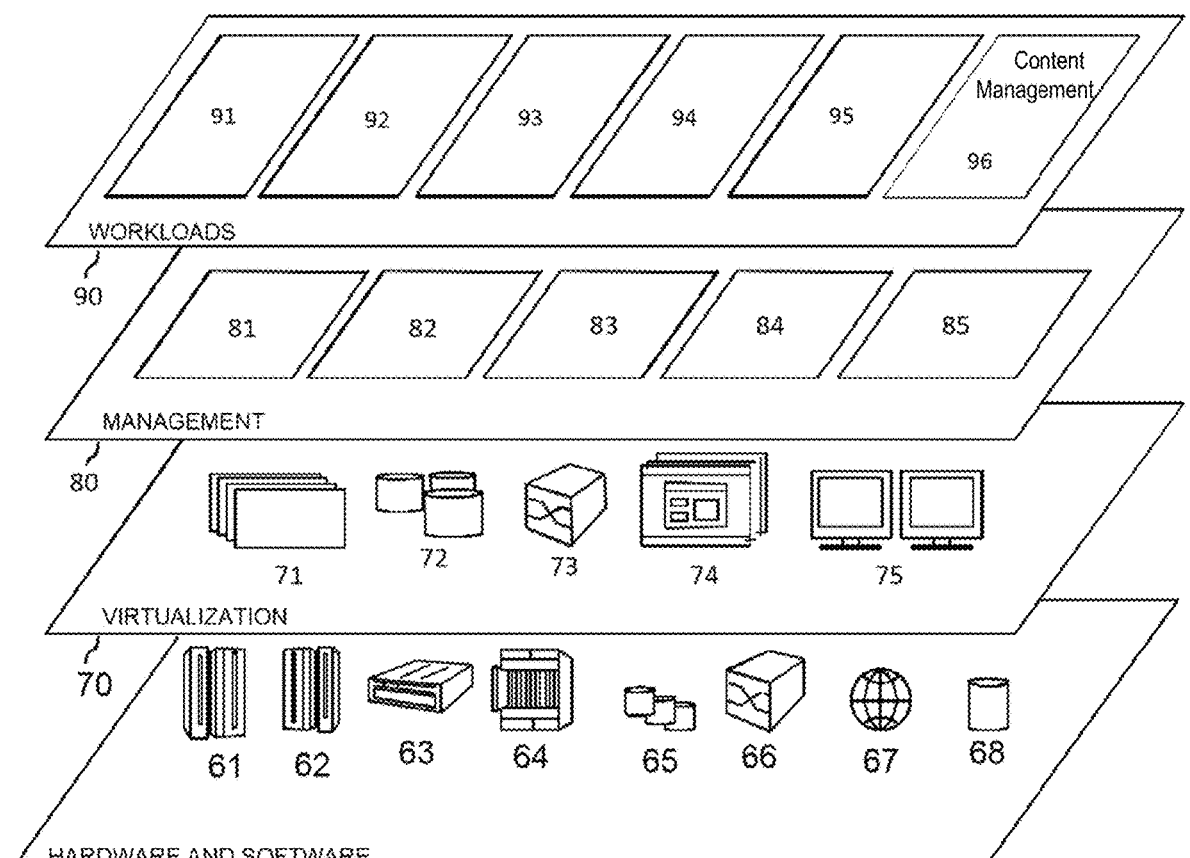
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and content management 96.

Implementations of the invention may include a computer system/server 12 of FIG. 1 in which one or more of the program modules 42 are configured to perform (or cause the computer system/server 12 to perform) one of more functions of the content management 96 of FIG. 3. For example, the one or more of the program modules 42 may be configured to: obtain data from a query or posted content submitted by a user, determine a topic of the query or posted content, match the topic to stored content in a database, determine that content can be shared with users, and selectively share content with users.

Figure 4:
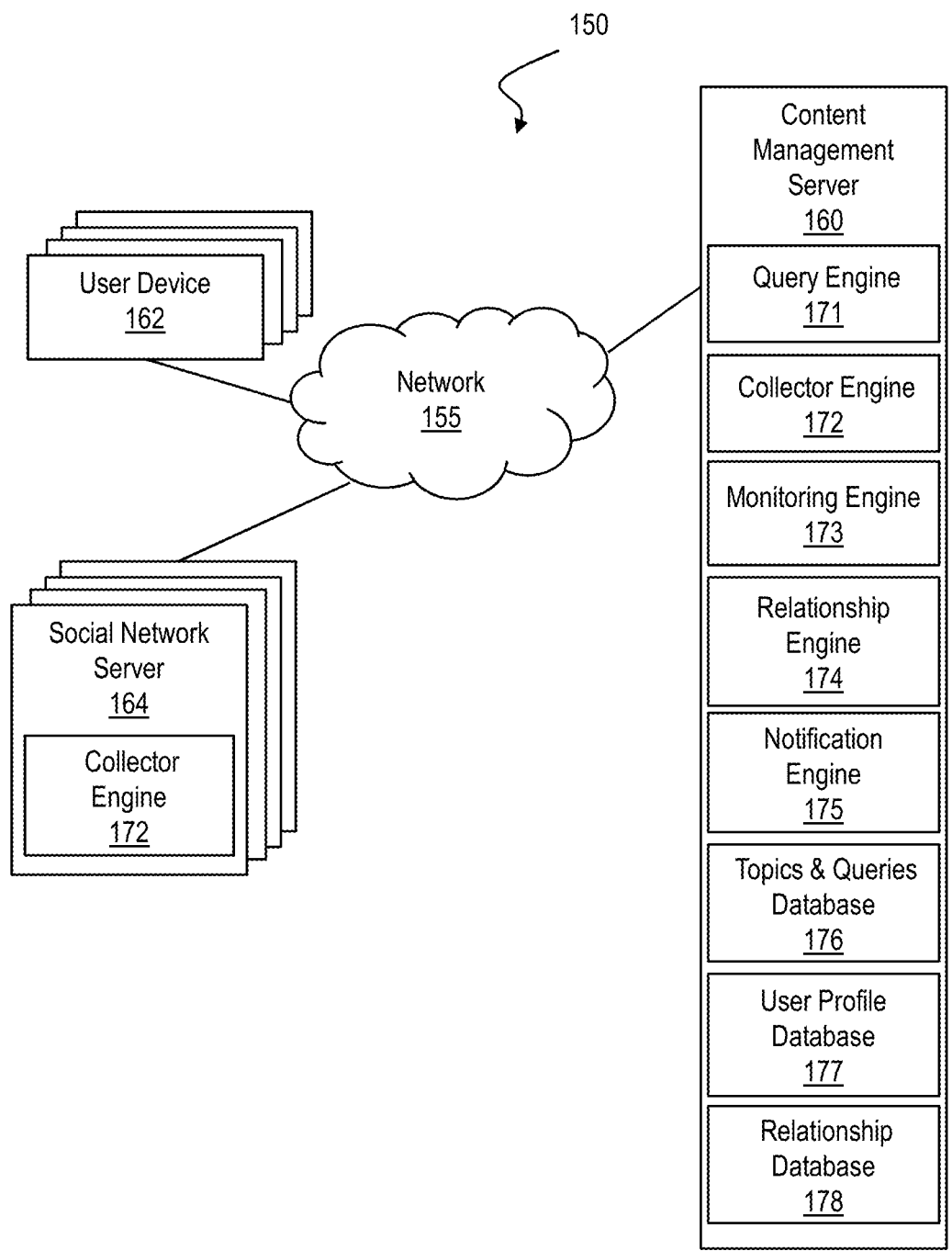
FIG. 4 shows a block diagram of an exemplary environment in accordance with aspects of the invention.

FIG. 4 shows an exemplary content sharing environment 150 in accordance with aspects of the invention. The content sharing environment 150 includes a network 155 connecting a content management server 160 (hereafter server 160) with a plurality of user devices 162 and one or more social network servers 164. The server 160 may comprise the computer system 12 of FIG. 1 and may be connected to the network 155 via the network adapter 20 of FIG. 1. The server 160 may be configured as a special purpose computing device that is part of a content management infrastructure, such as a cloud-based server 160 for distributing content between a plurality of social network servers 164 and user devices 162. In another example, the server 160 is a local server configured to manage content within an internal network of a corporation or organization. In certain embodiments, the server 160 may itself be a social network server 164 providing social networking services to one or more participant users.

The network 155 may be any suitable communication network or combination of networks, such as a local area network (LAN), a general wide area network (WAN), and/or a public network (e.g., the Internet). The user devices 162 may be any computing device of a user capable of implementing steps of the invention, such as a desktop computer, laptop computer, tablet computer, smartphone, etc. In implementations, the user devices 162 include elements of the computer system 12 of FIG. 1. The one or more social network servers 164 may include elements of the computer system 12 of FIG. 1 and may be local or cloud-based servers enabling communication between participants of one or more social networks.

Still referring to FIG. 4, the server 160 may include one or more program modules (e.g., program module 42 of FIG. 1) executed by the server 160 and configured to perform one or more of the functions described herein. In implementations, various computer engines comprising one or more program modules are provided to implement steps of the present invention. In embodiments, the server 160 includes one or more of a query engine 171, a collector engine 172, a monitoring engine 173, a relationship engine 174, a notification engine 175, a topics and queries database 176, a user profile database 177 and a relationship database 178.

In implementations, the query engine 171 is configured to receive content search queries from users (user devices 162) in the content sharing environment 150. In aspects, the collector engine 172 is configured to obtain content posted on one or more social networks (social network servers 164) in the content sharing environment 150, and store content in the topics and queries database 176. In embodiments, the collector engine 172 is configured to extract a main topic from every new content post on a social network server 164, update relevance data regarding a class of content and store the content with associated information (e.g., the main topic).

In embodiments, the monitoring engine 173 is configured to perform one or more of the following: monitor queries from users; monitor activity between users in the content sharing environment 150 (e.g., threads or topics of communications); extract information from queries to derive topics of the queries; match topics of queries to topics of stored content in the topics and queries database 176; match topics of posted content with topics of stored content in the topics and queries database 176; and send information to the notification engine 175 regarding content to be distributed to one or more users in the content sharing environment 150.

In implementations, the relationship engine 174 is configured to utilize user profile data from the user profile database 177 and the monitored activity between users from the monitoring engine 173 to define relationships between the users and store the relationships as relationship data in the relationship database 178. In aspects, the relationship engine 174 includes pluggable connectors configured to dynamically retrieve the "connection level" and "connection sentiment" between different users (parties) of one or more participating social networks.

In embodiments, the notification engine 175 is configured to receive information regarding content to be shared from the monitoring engine, and initiate sharing of the content to one or more approved users (user devices 162) in the content sharing environment 150. The server 160 may share the content either directly or indirectly with one or more users.

In embodiments, server 160 may include additional or fewer components than those shown in FIG. 4. Moreover, separate components may be integrated into a single computing component or module. Additionally, or alternatively, a single component may be implemented as multiple computing components or modules. Further, the quantity of devices and/or networks in the content sharing environment 150 is not limited to what is shown in FIG. 4. In practice, the content sharing environment 150 may include additional devices and/or networks; fewer devices and/or networks; different devices and/or networks; or differently arranged devices and/or networks than illustrated in FIG. 4.

Figure 5A:
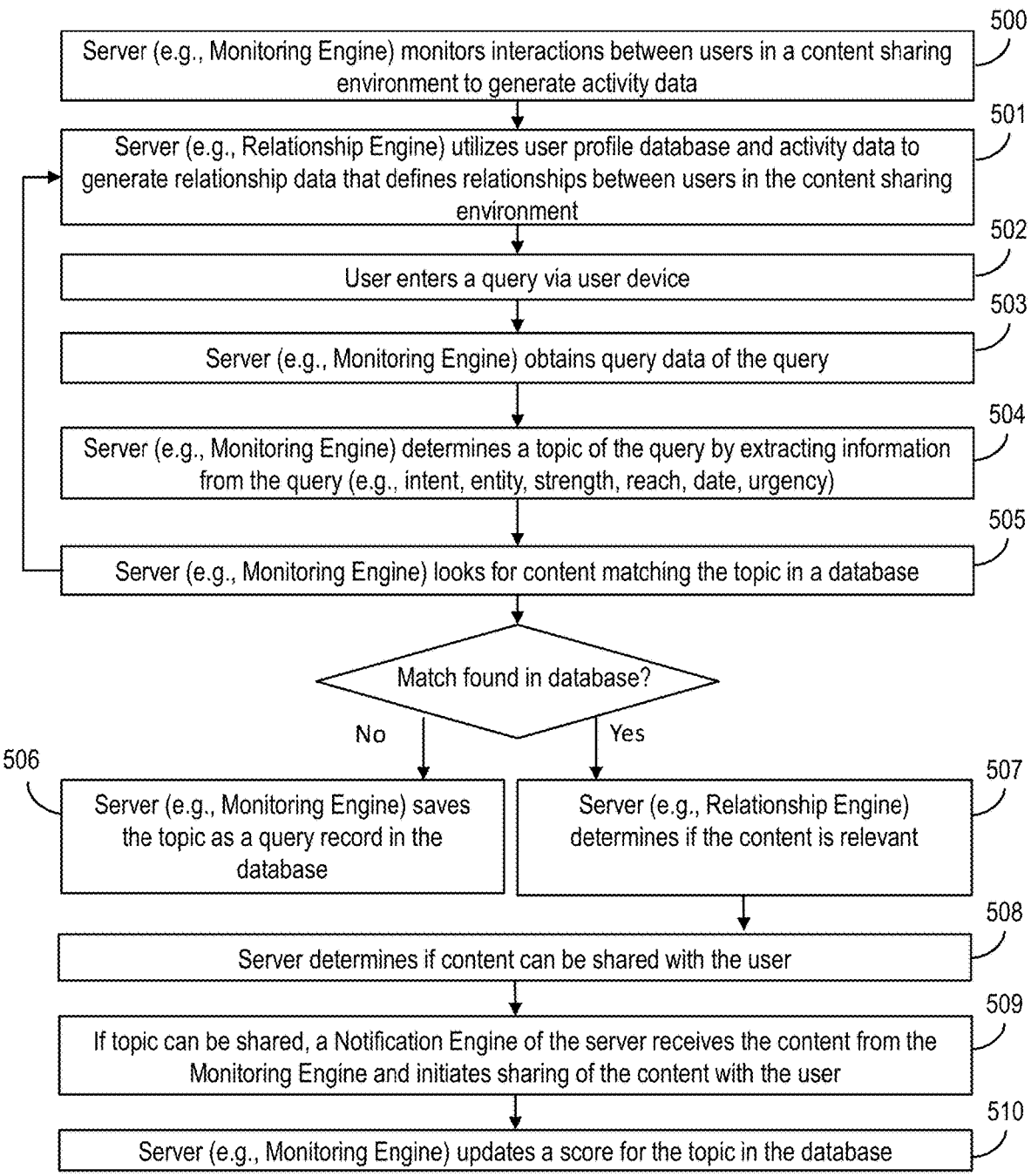
FIG. 5A shows a flowchart of a method of responding to a user query in accordance with aspects of the invention.

FIG. 5A shows a flowchart of a method of responding to a user query in accordance with aspects of the invention. Steps of the method of FIG. 5A may be performed in the environment illustrated in FIG. 4 and are described with reference to elements shown in FIG. 4.

At step 500, the server 160 monitors interactions between users in the content sharing environment 150 to generate activity data. In implementations, the monitoring engine 173 monitors input from users to the content sharing environment 150 including user search queries, posted content (e.g., content posted to one or more social network servers 164), and communications (e.g., emails, messages, etc.) between users. In aspects, the monitoring engine 173 monitors topics of conversation threads in different communications channels of the content sharing environment 150. The term "channel" as used herein refers to a single channel of communication within a social network for certain authorized users (e.g., a team of users) to share messages, tools and/or files. The term "thread" as used herein refers to a focused and organized side conversation within a channel, enabling users to respond directly to a message within the channel while keeping replies, images and other files organized under a single thread. The term posted content as used herein refers to content, including text-based messages, which is published for viewing by one or more other users on a social network server 164 or the server 160 of the content sharing environment 150 (e.g., published in a thread in a channel of the social network). In implementations, step 500 is implemented continuously or periodically such that new activity data is generated in real-time based on the real-time activities of users within the content sharing environment 150. Activity data may include identities of the participants in a thread or electronic communication within the content sharing environment 150, a topic of the thread or electronic communication, classifications of the thread or electronic communication (e.g., private message, group classification/purpose, etc.), frequency of interactions between users, or other types of activity data, for example.

At step 501, the server 160 generates relationship data that defines relationships between users in the content sharing environment based on user profile data in the user profile database 177 and activity data generated at step 500. In aspects, the relationship engine 174 of the server 160 implements step 501 and saves the relationship data in the relationship database 178. The relationship data may be in the form of one or more relationship graphs. Various tools for mapping relationships between users and generating relationship data may be utilized by the server 160 in the implementation of step 501.

At step 502 a user enters a query via a user device 162. Various methods of entering a query may be utilized. In aspects, a program of the user device 162 enables a user to enter a search query which is communicated directly to the server 160 (e.g., to the monitoring engine 173). In other implementations, a user enters a search query to a social network server 164 via the user device 162, and the social network server 164, based on appropriate permissions, shares the query with the server 160. In one example, a user enters a query "How can I address the problem ABC?" or "Where can I find more information related to the topic XYZ?" In alternative embodiments, the server 160 recognizes content in a post within the content sharing environment 150 as an implied query (e.g., a conversation exchange between users on a social network regarding topic XYZ).

At step 503, the server 160 obtains query data of the query entered by the user at step 502. For example, the query data may be text of the query. In implementations, the monitoring engine 173 of the server 160 obtains the query data at step 503.

At step 504, the server 160 determines a topic of the query by extracting information from the query data. In implementations, the monitoring engine 173 of the server 160 implements step 504. In aspects, information extracted from the query data includes one or more of: an intent of the request, an entity, a strength metric, a reach metric, a date of the request, and an urgency metric regarding urgency of the request. The term "intent of the request" refers to a main scope of the query. The intent of the request may include, for example, a reason for the topic of the query or a thread associated with the query, or an environment related to the topic or thread. The term "entity" as used herein refers to a subject of the query, for example, a thread name or a subject most used during a thread associated with the query or a special string (e.g., an incident number). The term "strength" as used herein refers to a likelihood that the topic or problem addressed by the query is being discussed in other channels (e.g., other social networks or defined channels of communication with the same social network). For example, strength can be calculated as the number of mentions of a topic against the total number of posts or replies within the content sharing environment 150. The term "reach" as used herein refers to how many people within the content sharing environment 150 have discussed the topic of the query. The term "urgency" as used herein refers to an urgency of the request derived from a tone of the query (message). In implementations, the server 160 extracts additional information from the query, including the author of the query (i.e., the user who submitted the query).

The server 160 may utilized natural language processing (NLP) tools to determine a topic of the query in step 504. In general, NLP is a subfield of computer science, information engineering, and artificial intelligence concerned with interactions between computers and human languages, in particular how to process and analyze large amount of natural language data. NLP tools of the server 160 may utilize word, phrase and context matching (e.g., keyword searching) to determine a topic in accordance with step 504. Machine learning may be utilized in conjunction with NLP tools to produce and/or update models utilized in the analysis of the query. The server 160 may perform semantic analysis, syntactic analysis and sentiment analysis in conjunction with step 504. In general, sentiment analysis refers to the user of NLP, text analysis, computational linguistics and/or biometrics to identify, quantify, extract and study sentiment-baring terms. In implementations, sentiment analysis quantifies sentiments expressed by text to generate positive or negative sentiment scores. In implementations, server 160 may utilize remote content analysis services in the implementation of step 504. One example of such a service is IBM Watson®, from International Business Machines Corporation ("IBM"). IBM Watson® is a registered trademark of IBM in the United States.

At step 505, the server 160 looks for content that matches the topic in the topics and queries database 176. In implementations, the monitoring engine 173 of the server 160 implements step 505. In aspects, the monitoring engine 173 determines if there is any "topic asked" in the topics and queries database 176 that has already been requested by some other user that "match" the "topic" just determined at step 504. In embodiments of the invention, a matching algorithm is used to find a "topic asked" in the topics and queries database 176 that matches the query "topic". The matching algorithm is implemented using a function with n-variables $f(x1, x2, \ldots, xn)$ that calculates the normalized sum of the "distance" between input and output parameters. A non-exhaustive list of exemplary input and output parameters includes: topic, entity, strength, reach, date of the query, and urgency of the query. In implementations, the calculated value needs to be under a specific and configurable threshold in order to return a successful match. That is, the server 160 may calculate the normalized sum of a distance (e.g., close correlation or distant correlation) between information (e.g., topic, entity, strength, etc.) of the query and the content, and determine that a match has been found between the query and the content in the topics and queries database 176 when the normalized sum meets or exceeds a predetermined threshold value. A variety of matching techniques and tools may be utilized in the implementation of step 505.

At step 506, if no match is found in the topics and queries database 176 at step 505, the topic determined at step 504 is saved in the topics and queries database 176 as a query with the associated information extracted at step 504. In one example, a user submits a query looking for content regarding a software development project for a client X, and information extracted from the query at step 504 is saved with the topic "software development project for client X" with information regarding: intent, entity, strength, reach, data and urgency.

At step 507, if there is a match for the topic at step 505 (e.g., a "match" for the "topic asked") with content in the topics and queries database 176, related information of the content (e.g., information extracted from the content and stored with the content topic in the topics and queries database 176) is then checked to determine if the "topic" is "relevant" and if so, if it can be shared with one or more users.

In embodiments, the server 160 determines relevance of a topic based on the following. In this example, T is the full set of the topics, C is the class label, with S being a subset, and $S \subseteq T$. In this example P is probability. The goal of topic selection can be a minimum subset S such that $P(C|S)$ is equal or close as possible to the $P(C|T)$ where $P(C|S)$ or $P_S(C)$ is the probability distribution of different classes given the topic value in S and $P(C|T)$ or $P_T(C)$ is the original distribution given the topic value in T. A minimum subset S is called an optimal subset. The server 160 askes how a topic is relevant; if it is a strong relevance or a weak relevance; and how a topic influences the classification.

In this example, $t_i$ is the topic, and $S_i = T - \{t_i\}$. In implementations, the server 160 classifies a topic relevance in six (6) categories:

1) Strong positive relevance $\forall S'_i \subseteq S_i, P(C|t_i S'_i) > P(C|S'_i)$ 2) Strong negative relevance $\forall S'_i \subseteq S_i, P(C|t_i S'_i) < P(C|S'_i)$ 3) Strong irrelevant $\forall S'_i \subseteq S_i, P(C|t_i S'_i) = P(C|S'_i)$ 4) Weak positive relevance $\exists S'_i \subseteq S_i, P(C|t_i S'_i) > P(C|S'_i)$ and $\neg \forall S'_i \subseteq S_i, P(C|t_i S'_i) > P(C|S'_i)$ 5) Weak negative relevance $\exists S'_i \subseteq S_i, P(C|t_i S'_i) < P(C|S'_i)$ and $\neg \forall S'_i \subseteq S_i, P(C|t_i S'_i) > P(C|S'_i)$ 6) Weak irrelevant $\exists S'_i \subseteq S_i, P(C|t_i S'_i) = P(C|S'_i)$ and $\neg \forall S'_i \subseteq S_i, P(C|t_i S'_i) > P(C|S'_i)$ The strongly positive relevant topic subset is: A subset of topic $S \subseteq T$ is a strongly positive relevant topic subset if:

$\forall t_i \in S, t_i$ is strongly positive relevant.

A strong relevance means an absolute or unconditional relationship between the topic and class.
A weak relevance implies a relative or conditional relationship between a topic and class.

At step 508, the server 160 determines if content can be shared with the user after determining that the content is relevant at step 507. In aspects, the monitoring engine 173 of the server 160 sends a request to the relationship engine 174 for a determination regarding whether the matching content can be shared with the user who submitted the query. In implementations, the relationship engine 174 utilizes a relationship graph and social channel interactions to determine if the matching content can be shared. For example, the relationship engine 174 may determine, based on predetermined characteristics of the users associated with the matching content and predetermined characteristics of the user who submitted the query, if the matching content is eligible to be shared with the user who submitted the query based on stored rules. In implementations, the server 160 is configured to classify at least one message (posted content) as private, wherein the classification is based on the topic derived from the message and on the relationship information related to users having sent or received the message. In such situations, the server 160 (e.g., notification engine 175) prevents sharing of the message to any further users in response to the message being classified as private. In one example, a user associated with matching content has a "top secret" clearance level and the user who submitted the query has a "confidential" clearance level. In this case, stored rules may dictate that the server 160 determine that the content of the "top secret" user cannot be shared with the "confidential" user.

At step 509, if the topic can be shared as determined at step 508, the server 160 initiates sharing of the matching content with the user who submitted the query. In implementations, the sharing of the content occurs after the content has been posted to a thread and/or channel in a social network. In implementations, the notification engine 175 of the server 160 receives the matching content from the monitoring engine 173 and shares it with the user who submitted the query. In implementations, the server 160 shares a link to the matching content with the user. In other implementations, the server 160 sends the content directly to a user device 162 of the user who submitted the query.

In embodiments, the user/requester who submitted the query is not statically connected to the author of the posted content and/or the content that is shared with the user/requester. For example, in embodiments, the user/requester is not a participant in the same channel as the author of the posted content, is not a participant in the channel and/or thread where the content was posted, and/or is not a "friend" or user who is already authorized to access to the author's posted content through a predetermined connection within the social network. In embodiments, the posted content that is shared with the user/requester is not statically related to the user through any channels or threads that the user/requester is participating in. In other words, in embodiments, without the cognitive analysis and sharing determinations of the server 160, the user/requester would not have access to content shared with them at step 509. Based on the above, it can be understood that embodiments of the invention provide effective and appropriate sharing of content that would not normally be known to the user/requester based on a strength metric or potential relevance of the message, a reach metric describing the number of users involved with the topic and/or urgency metric based on tone analysis applied to the message. Moreover, embodiments of the invention reduce noise in a social channel by bringing a user's attention only to those topics the user is interested in based on a cognitive analysis of the user's prior history (e.g., the user's interaction in the past with threads associated with the same topics).

At step 510, the server updates a score for the topic of the query in the topics and queries database 176 based on the query received at step 503. A score may indicate the popularity of the topic within the content sharing environment 150.

Figure 5B:
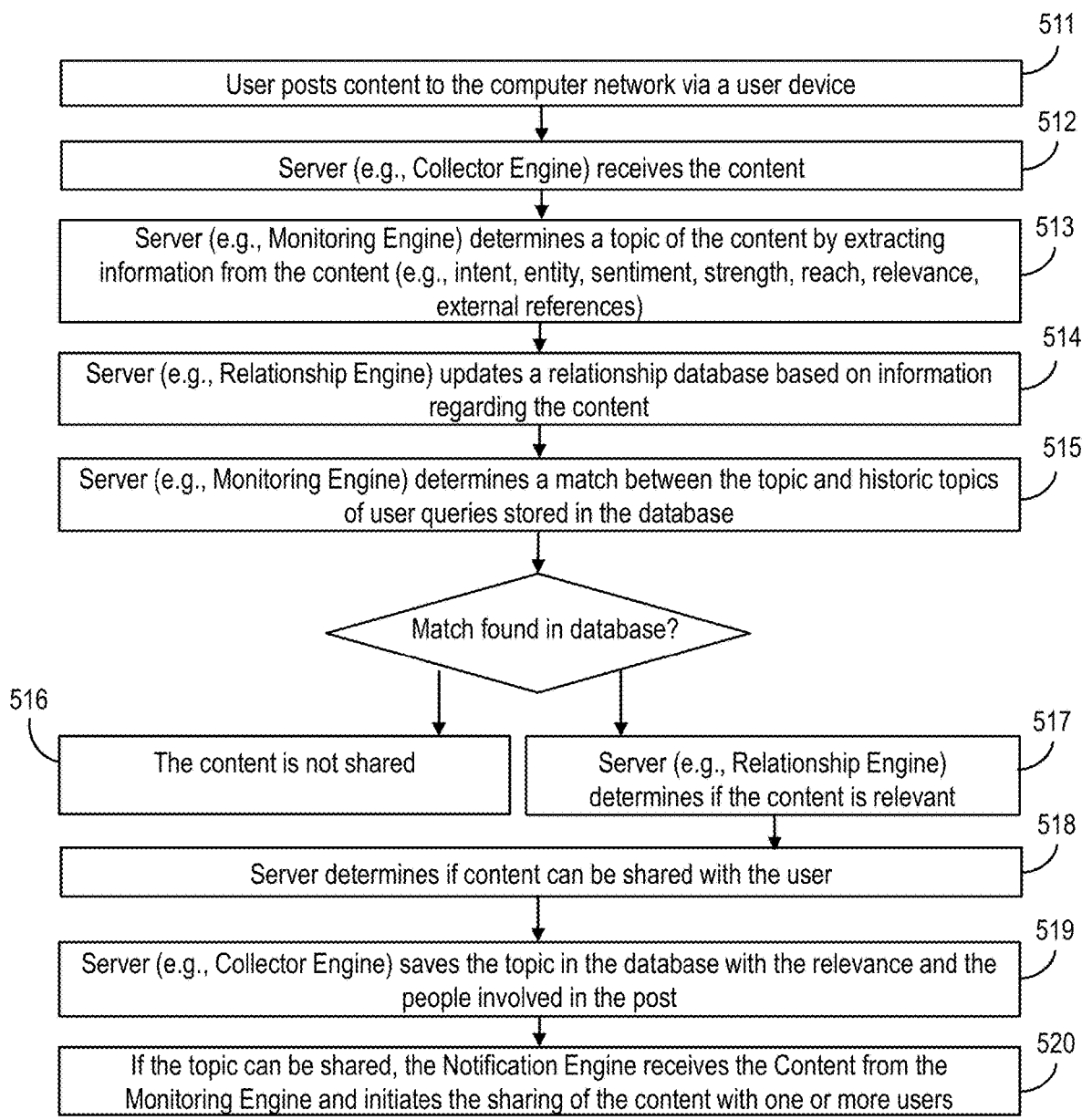
FIG. 5B shows a flowchart of a method of distributing posted content to users in accordance with aspects of the invention.

FIG. 5B shows a flowchart of a method of distributing posted content to users in accordance with aspects of the invention. Steps of the method of FIG. 5B may be performed in the environment illustrated in FIG. 4 and are described with reference to elements shown in FIG. 4. Steps of FIG. 5B may be performed in conjunction with one or more steps of FIG. 5A.

At step 511, a user of the content sharing environment 150 posts content to a computing device in the content sharing environment (e.g., a social network server 164 or the server 160) via a user device 162. The content may be, for example, a text-based message which is a stand-along message or part of a string or thread of messages. The posted content may be posted to a group, posted to one or more other users within the content sharing environment 150 as a public message, or posted as a private message to one or more other users within the content sharing environment 150, for example. One example of content posed by a user is "Thank you Roberto for helping to address the problem ABC! I have attached the code snippet here . . . " or "Let me share this new article that Salvator posted in Social Network D that describes exciting news about the topic XYZ."

At step 512, the server 160 receives the content posted at step 511. In embodiments, the collector engine 172 of the server 160 obtains the content from the social network server 164. In alternative embodiments, the content is posted directly to the server 160. In implementations, the server 160 or one or more social network servers 164 provide users with selectable opt-in features to enable the user to enable sharing of their posted content with the server 160.

At step 513, the server 160 determines a topic of the posted content obtained at step 512 by extracting information from the content. In implementations, the collector engine 172 of the server 160 implements step 513. In aspects, information extracted from the posted content includes one or more of: an intent of the request, an entity, a sentiment metric, a strength metric, a reach metric, external references, and a relevance metric regarding relevance of the content. The term "intent of the request" refers to a main scope of the content. The intent may include, for example, a reason for the topic of the content or a thread associated with the content (post), or an environment related to the topic or thread. The term "entity" as used herein refers to a subject of the content, for example, a thread name or a subject most used during a thread associated with the content or a special string (e.g., an incident number). The term "strength" as used herein refers to a likelihood that the topic or problem addressed by the content is being discussed in other channels (e.g., social networks or defined channels within a social network). For example, strength can be calculated as the number of mentions of a topic against the total number of posts or replies within the content sharing environment 150. The term "reach" as used herein refers to how many people within the content sharing environment 150 have discussed the topic. The term "urgency" as used herein refers to an urgency of the content derived from a tone of the content. The term "external references" refer to any external reference to additional information, such as a real-time clock (RTC) or Git (a distributed version-control system for tracking changes in source code). The "relevance" of the content refers to how relevant the content is with respect to other topics within the content sharing environment 150.

Similar to step 504 of FIG. 5A, the server 160 may utilized NLP tools to determine a topic of the content in step 513. The NLP tools of the server 160 may utilize word, phrase and context matching (e.g., keyword searching) to determine a topic in accordance with step 513. Machine learning may be utilized in conjunction with NLP tools to produce and/or update models utilized in the analysis of the query. The server 160 may perform semantic analysis, syntactic analysis and sentiment analysis in conjunction with step 513. The server 160 may utilized social network information associated with posted content, such as the type of channel (e.g., purpose of channel, users of the channel, etc.) the content was posted to, the thread the content was posted to (e.g., purpose of thread and participants in thread), or other information. In implementations, an analytical/cognitive mechanism (e.g., collector engine 173) is provided to extract relevant sentences from a discussion posted to a social network based on a context of a specific social network channel and builds the sentences together during cognitive analysis. In aspects, the server 160 splits a stream of posts into threads and classifies each thread with a given topic.

At step 514, the server 160 updates the relationship database 178 based on the information gathered at step 513.

For example, the relationship database 178 may update a relationship graph based on the user who posted the content, the one or more users the content was shared with, and the topic of the content.

Still referring to FIG. 5B, at step 515, the server 160 determines a match between the topic of the content and historic topics of one or more user queries stored in the topics and queries database 176. In implementations, the monitoring engine 173 of the server 160 implements step 515 and determines if there is any "topic asked" in the topics and queries database 176 that has already been requested by some other user that "match" the "topic" just determined at step 513. A variety of matching techniques and tools may be utilized in the implementation of step 515.

At step 516, if no matches are found at step 515, then the server 160 does not cause the content posted at step 511 to be shared with any additional user of the content sharing environment 150. In embodiments, the monitoring engine 173 implements step 516.

At step 517, if there is a match for the topic at step 515 (e.g., a "match" for the "topic asked"), related information of the content (e.g., information extracted at step 513) is then checked to determine if the "topic" is "relevant" and if so, if it can be shared with one or more users. In embodiments, the server 160 determines relevance of a topic utilizing the same calculations discussed above with respect to step 507.

At step 518, the server 160 determines if content can be shared with one or more other users. In aspects, the monitoring engine 173 of the server 160 sends a request to the relationship engine 174 for a determination regarding whether the content can be shared with one or more other users associated with matching queries. In implementations, the relationship engine 174 utilizes a relationship graph and social channel interactions to determine if the matching content can be shared. For example, the relationship engine 174 may determine, based on predetermined characteristics of the user associated with the content and predetermined characteristics of a user who submitted a query, if the content is eligible to be shared with the user who submitted the query based on stored rules. In one example, the user who submitted the content has a "top secret" clearance level and a user who previously submitted a matching query has a "confidential" clearance level. In this case, stored rules may dictate that the server 160 determine that the content of the "top secret" user cannot be shared with the "confidential" user.

At step 519, the server 160 saves the topic of the posted content in the topics and queries database 176, along with associated data. For example, the server 160 may save the topic of the post, the user who submitted the post, the date of the post, the time of the post, the urgency of the post, etc. In implementations, the collector engine 172 implements step 519.

At step 520, if the content can be shared as determined at step 518, the server 160 initiates the sharing of the content with one or more users associated with matching queries. In implementations, the notification engine 175 of the server 160 receives the content from the monitoring engine 73 and shares it with the one or more users associated with the matching queries. In implementations, the server 160 shares a link to the content with the one or more users. In other implementations, the server 160 sends the content directly to respective user devices 162 of the one or more users.

In implementations, the server 160 keeps information regarding posted content in a hold queue until a triggering event causes the server 160 to notify users of the content (e.g., send the users the content or provide the users with a link to the content). One example of a triggering event is when a topic of posted content is referenced in a forum, or when there are a number of hashtag-related content posts in another thread on the same social network that meets a predetermined threshold. For example, content posted for topic "XYZ" may not be shared by the server 160 with other users until a number of hashtags for "XYZ" in the same social network (e.g. social network server 164) meet or exceeds fifty (50) hashtags.

Figure 6:
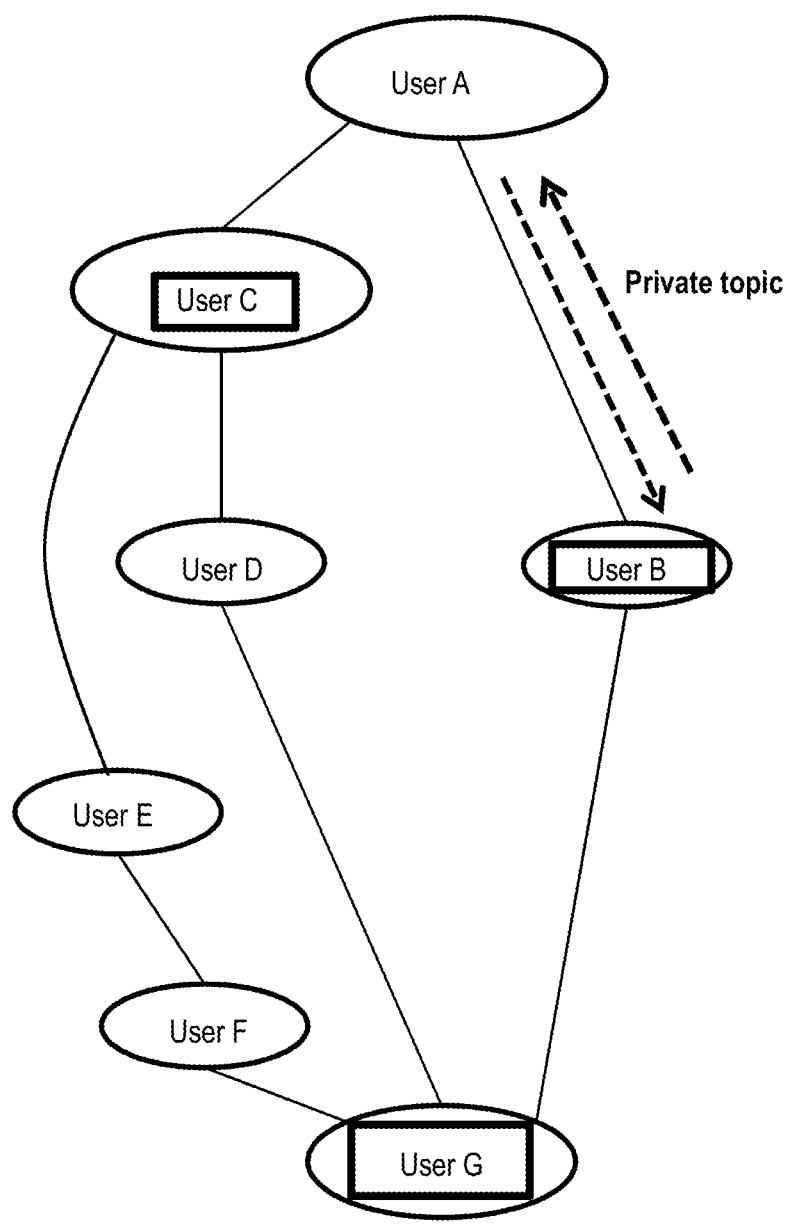
FIG. 6 is a diagram illustrating relationships between users of the content sharing environment in accordance with embodiments of the present invention.

FIG. 6 is a diagram illustrating relationships between users of the content sharing environment 150 in accordance with embodiments of the present invention. In implementations, the server 160 creates relationship data in a dynamic way (e.g., not just based on group memberships). In implementations, the server 160 utilizes the following information to generate relationship data: user profile information; thread discussions in the one or more social networks (represented by social network servers 164); a role of a user; a timeframe of the discussion/posted content; and a thread sentiment. In one example, the server 160 determines a sentiment of a thread utilizing computer sentiment analysis and, if the sentiment is determined to be positive, relationship data is stored indicating a positive relationship between users associated with the thread. In this example, if the thread is negative, the server 160 does not save relationship data for the thread.

By utilizing the above-identified information (e.g., role of users, timeframe, thread sentiment), the server 160 is able to decide if content of a first user can be shared with a second user where there is no direct static relationship between the first and second users in the content sharing environment. The server 160 may utilize predetermined stored rules to decide whether content may be shared. For example, rules may include the names of user who are allowed to receive content, types of topics or categories of topics that may be shared with particular users, types of users or groups of users, rules based on privacy settings of individual users, etc. In the example of FIG. 6, the relationship engine 174 determines if content posted by a User C on topic "XYZ" can be shared with User G, where there is no direct relationship between User C and User G. In this example, User C is not a "friend" of User G within a social network represented by FIG. 6. In another example depicted in FIG. 6, the server 160 determines if content posted by User B for topic "ABC" in a private communication with User A can be shared with User G, who has no direct relationship with User A (e.g., User G does not belong to the group of users within the social network as User A). In the scenario of FIG. 6, the server 160 determines that the private message regarding topic "ABC" cannot be shared with User G based on the privacy settings of User A in User A's profile data.

Figure 7:
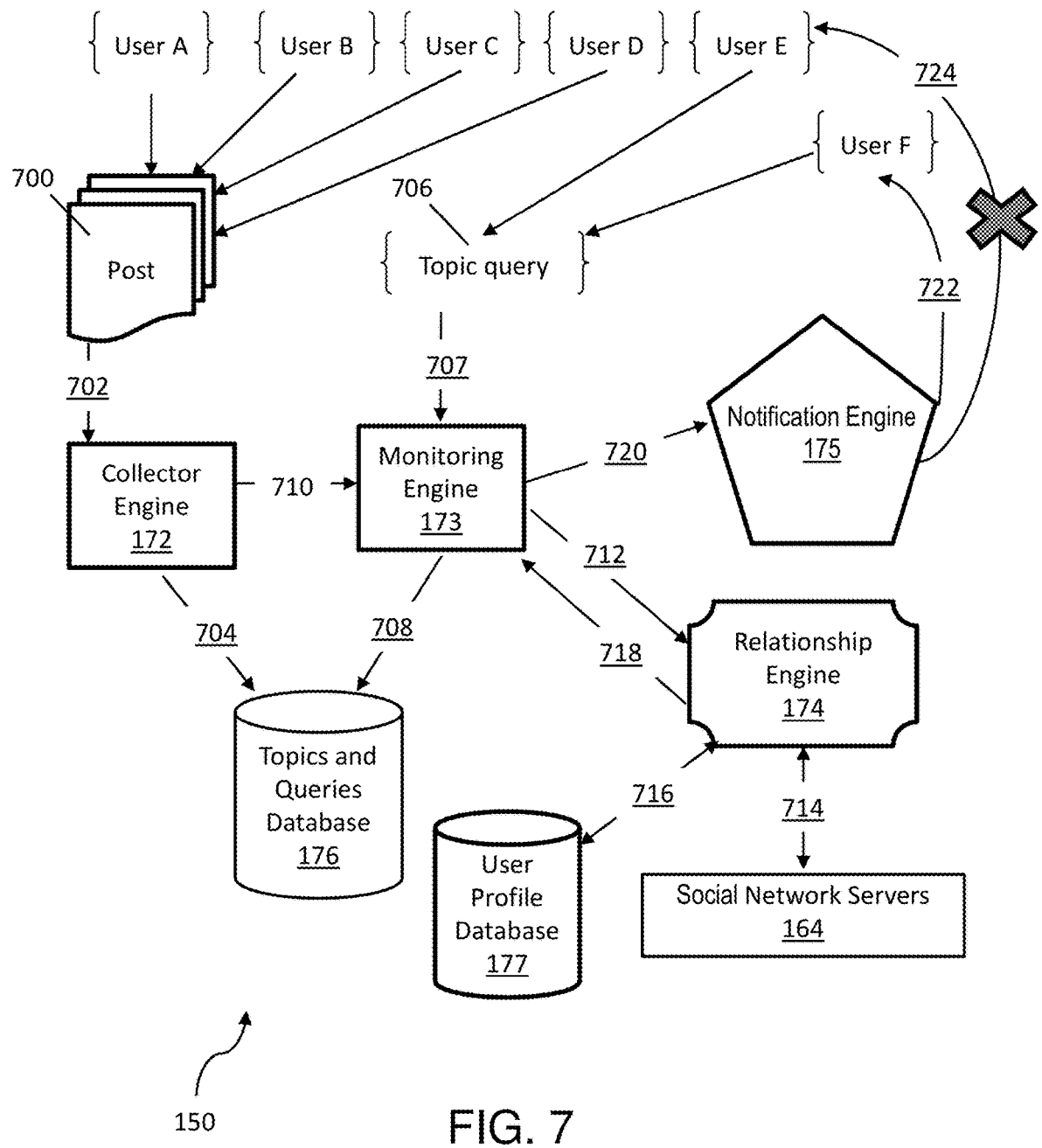
FIG. 7 is a diagram representing an exemplary use scenario in accordance with embodiments of the present invention.

FIG. 7 is a diagram representing an exemplary use scenario in accordance with embodiments of the present invention. The scenario of FIG. 7 is performed in the content sharing environment 150 of FIG. 4 and may be implemented in accordance with steps of FIGS. 5A and 5B.

In the scenario of FIG. 7, several users of the content sharing environment 150 (User A, User B, User C, User D and User E) post content 700 regarding a topic "ABC". The collector engine 172 of the server 160 obtains the content 700 of the posts at 702 and extracts information from the content 700, including the authors of the content posts (Users A-E, respectively), and the topic "ABC" of the content. The information extracted, including the determined topic "ABC", is saved in the topics and queries database 176 at 704.

With continued reference to FIG. 7, Users E and F submit respective queries 706 to the server. The monitoring engine 173 obtains query data at 707 and analyzes the queries 706 to extract information regarding the queries 706, including the topic of the queries "ABC". The monitoring engine 173 then stores the information associated with the queries 706 in the topics and queries database 176 at 708. The monitoring engine 173 receives information regarding the content 700 from the collector engine 172, including the topic "ABC" at 710, and determines if any content 700 stored in the topics and queries database 176 match the topic "ABC". In this scenario, the queries 706 from both User E and User F match the topic "ABC" of the posted content 700. The monitoring engine 173 requests approval from the relationship engine 174 at 712 to share the content 700 with User E and User F.

The relationship engine 174 continuously gathers relationship data from social networks (social network servers 164) in the content sharing environment 150 as indicated at 714, and also accesses information of the users (e.g., Users A-F) in user profiles stored on the user profile database 177, as indicated at 716. In this scenario, information of the users includes information regarding a role or classification of the users. Based on the relationship data and stored rules, the relationship engine 174 determines if the posted content 700 can be shared with User E and User F. In this scenario, the relationship engine 174 determines, based on roles of the Users A-D who provided the content 700, and the Users E and F who requested content for topic "ABC", that the content 700 can be shared with User F, but not with User E. The relationship engine 174 returns this determination to the monitoring engine 173 at 718, and the monitoring engine 173 sends instructions to the notification engine 175 at 720 to share the content 700 with User F only. The notification engine 175 then forwards the content 700 to User F at 722 in response to the query 706 of User F. In this scenario, the notification engine 175 sends User E a response to the query 706 indicating that no content is available at 724.

Figure 8:
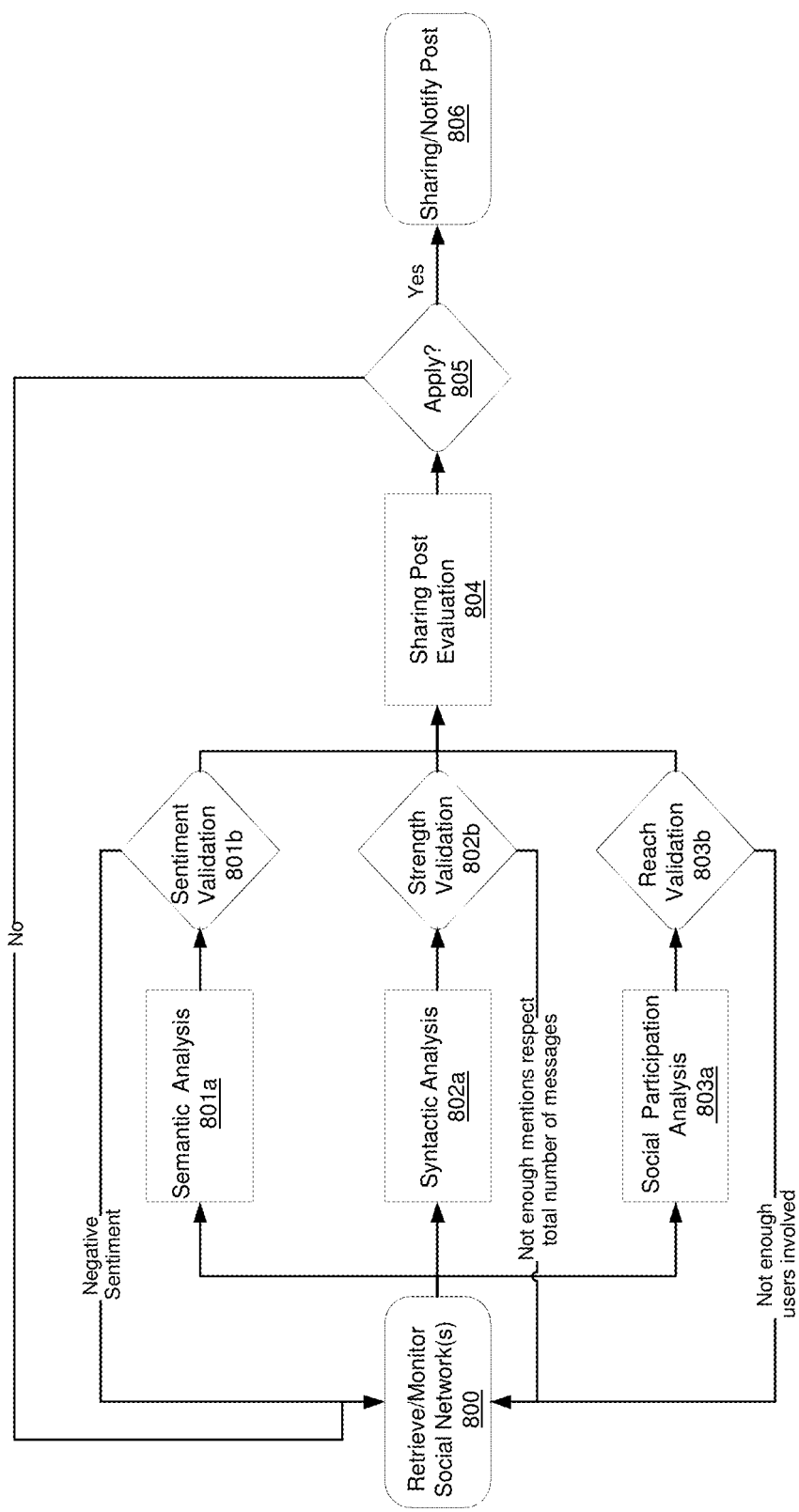
FIG. 8 is a flowchart depicts an exemplary content sharing scenario in accordance with embodiments of the present invention.

FIG. 8 is a flowchart depicts an exemplary content sharing scenario in accordance with embodiments of the present invention. The scenario of FIG. 8 may be implemented in accordance with steps of FIGS. 5A and 5B and within the content sharing environment 150 of FIG. 4.

At 800, the server 160 retrieves and monitors content from one or more social network sources. In implementations, before sharing newly posted content added in a channel (e.g., social network) with a user who submitted a request for content (e.g., in accordance with step 502 of FIG. 5A), the server 160 analyzes the posted content from different perspectives using threshold values in order to evaluate whether to share the posted content with the user/requester. In the example of FIG. 8, the server 160 conducts an analysis of the content, including a semantic analysis 801a, a syntactic analysis 802a and a social participation analysis 803a.

The term semantic analysis as used herein refers to the process of relating syntactic structures, from the levels of phrases, clauses, sentences and paragraphs, to the level of the writing as a whole, to determine their language-independent meanings. Various semantic analysis tools and methods may be utilized by the server 160 in the implementation of step 801a. The term syntactic analysis as used herein refers to the process of analyzing a sentence or other string of words into its constituents, resulting in a parse tree showing their syntactic relation to each other, which may also contain semantic or other information. Various syntactic analysis tools and methods may be utilized by the server 160 in the implementation of step 802a. The term social participation analysis as used herein refers to the analysis of the type and source of the content to determine the importance of the content to the community of users as a whole (i.e., user of the content sharing environment 150). Various social participation analysis tools and methods may be utilized by the server 160 in the implementation of step 803a.

In the scenario of FIG. 8, the server 160 performs sentiment analysis in addition to semantic analysis, to categorize content as positive or negative. More specifically, at step 801b, the server 160 performs a sentiment analysis of incoming content and assigns sentiment scores to the content (e.g., negative or positive scores). The server 160 determines if predetermined sentiment thresholds are met (e.g., the content has a positive score), and if the threshold is met, the server 160 determines that the content may be shared if other threshold parameters (e.g., strength and reach) are met. If the threshold is not met, the server 160 determines that the content will not be shared.

Still referring to FIG. 8, the server 160 also performs a strength analysis at 802b after syntactic analysis 802a, in order to determine a likelihood that the topic of the content is being discussed in other channels (e.g., other social networks in the content sharing environments 150 or defined channels in a single social network), calculated as the number of mentions in posted content against the total number of posted content (e.g., including posted content and replies to the posted content). The server 160 determines if the likelihood meets a predetermined threshold value. If there are not enough mentions of the topic of the content with respect to the total number of posted content, then the server 160 determines that the content will not be shared. On the other hand, if the topic of the content meets the threshold value, the server 160 determines that the content may be shared if other threshold parameters (e.g., sentiment and reach) are met.

At 803b, the server 160 determines several users within the content sharing environment 150 that have discussed the topic of the content, and determines if the number of users meets a predetermined threshold value. If the number of users discussing the topic meet the threshold value, then the server 160 determines that the content may be shared if other threshold parameters (e.g., sentiment and strength) are met. On the other hand, if the number of users does not meet the threshold value, the server 160 determines that the content will not be shared.

Based on the analysis at steps 801b, 802b and 803b, the server 160 determines if the content posted can be shared (i.e., whether threshold values for sharing were met). If all the threshold values for sharing are met at 804, the server 160 determines if the content can be shared with the user who requested the content at 805 based on relationship data obtained by the server 160. See, for example, step 518 of FIG. 5B. If the content cannot be shared with the particular user who requested content, then the server 160 does not forward the posted content to the user. However, if the server 160 determines that the content can be shared with the user/requester, the server 160 initiates sharing of the content with the user/requester at 806.

To the extent implementations of the invention collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. In embodiments, users of the content sharing environment 150 selectively enable sharing of posted content on one or more social network servers 164 with the server 160.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In implementations, a system is provided for automatically sharing a message posted in a social network by a user with a set of further users. The system includes: a collector engine 172 operable for obtaining/collecting messages posted by the at least one first user; a monitoring engine 173 operable for deriving topic information from the messages obtained by the collector engine; a relationship engine 174 operable for maintaining relationship information describing a social relationship between users of the social network; and a notification engine 175 operable for calculating the set of further users based on the topic information and the relationship information. The system is operable for classifying at least one message as private, the classifying being based on the topic derived from the message and on the relationship information related to users having sent or received this message. Additionally, the notification engine is operable for preventing sharing this message to any further users in response to classifying the message as private.

In embodiments, deriving topic information includes determining from the content of the message at least one of: an intent, a subject of the message, a strength metric describing the potential relevance of the message, a reach metric describing the number of users involved with the topic of the message, a date, or an urgency metric determined based on tone analysis applied to the message. In implementations, the system is operable for providing a user of the set of further users with the message upon receipt of a search request submitted by this user to the system. In aspects, the system is operable for providing the user of the set of further users with the message upon receipt of a comment submitted by this user to the system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining, by a computing device, query data from a query submitted by a user on a social network;
determining, by the computing device, a topic of the query by extracting information tom the query data;
determining, by the computing device, the topic matches content stored in a content database;
determining, by the computing device, that the matched content can be shared with the user based on relationship data dynamically derived tom user activity within the social network; and
initiating, by the computing device, sharing of the matched content with the user based on the determining that the matched content can be shared, wherein the user is not statically connected to the matched content or the author of the matched content in the social network.

2. The computer-implemented method of claim 1, further comprising:
monitoring, by the computing device, activity on the social network between users of the social network;
dynamically generating, by the computing device, the relationship data defining relationships between the users of the social network based on the activity and user profile data of the users in a user profile database; and
storing, by the computing device, the relationship data in the relationship database.

3. The computer-implemented method of claim 2, wherein the dynamically generating the relationship data is further based on one or more of the group consisting of a thread of the query in the social network; a pre-defined role of the user within the social network; a time tame of the query; and a sentiment of the thread of the query.

4. The computer-implemented method of claim 2, wherein the dynamically generating the relationship data is further based on a thread of the query in the social network.

5. The computer-implemented method of claim 2, wherein the dynamically generating the relationship data is further based on a time frame of the query.

6. The computer-implemented method of claim 2, wherein the dynamically generating the relationship data is further based on a sentiment of the thread of the query.

7. The computer-implemented method of claim 1, further comprising updating, by the computing device, a score for the topic in the content database based on the determining the topic matches the content stored in the content database.

8. The computer-implemented method of claim 1, wherein the information extracted from the query includes one or more of the group consisting of intent of the query; a subject of the query, likelihood that the topic is being discussed in channels within the social network; how many users of the social network have discussed the topic in the past a date of the query; and an urgency derived from a tone of the query.

9. The computer-implemented method of claim 1, further comprising:
- obtaining, by the computing device, posted content submitted by another user on the social network;
- determining, by the computing device, a topic of the posted content;
- matching, by the computing device, the topic of the posted content to topics in the content database, wherein the topics in the content database are topics of user queries submitted on the social network;
- determining in response to the matching, by the computing device, that the topic of the posted content is relevant to one or more users on the social network based on information derived from the posted content; and
- sharing, by the computing device, the posted content with the one or more users on the social network based on the topic being relevant.

10. The computer-implemented method of claim 1, wherein the computing device includes software provided as a service in a cloud environment.

11. The computer-implemented method of claim 1, wherein the information extracted from the query includes a subject of the query.

12. The computer-implemented method of claim 1, wherein the information extracted from the query includes likelihood that the topic is being discussed in channels within the social network.

13. The computer-implemented method of claim 1, wherein the information extracted from the query includes how many users of the social network have discussed the topic in the past.

14. The computer-implemented method of claim 1, wherein the information extracted from the query includes a date of the query.

15. The computer-implemented method of claim 1, wherein the information extracted from the query includes an urgency derived from a tone of the query.

16. The computer-implemented method of claim 1, further comprising:
- obtaining posted content submitted by another user on the social network;
- determining the posted content is relevant to one or more users; and
- in response to determining the posted content is relevant to one or more users, determining whether the posted content can be shared with the one or more users.

17. The computer-implemented method of claim 16, further comprising sharing the posted content can be shared with the one or more users in response to determining the posted content can be shared with the one or more users.

18. The computer-implemented method of claim 17, wherein the determining whether the posted content can be shared with the one or more users comprises performing semantic analysis, syntactic analysis, and social participation analysis.

19. The computer-implemented method of claim 18, further comprising performing sentiment validation based on the semantic analysis, strength validation based on the syntactic analysis, and reach validation based on the social participation analysis.

20. The computer-implemented method of claim 19, further comprising determining the matched content can be shared based on passing each of the sentiment validation, the strength validation, and the reach validation.

* * * * *